US008195033B2

(12) United States Patent
Murata

(10) Patent No.: US 8,195,033 B2
(45) Date of Patent: Jun. 5, 2012

(54) VIDEO CREATING SYSTEM AND PROGRAM PRODUCT FOR CREATING VIDEO

(75) Inventor: Taku Murata, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 663 days.

(21) Appl. No.: 12/388,598

(22) Filed: Feb. 19, 2009

(65) Prior Publication Data

US 2009/0214173 A1 Aug. 27, 2009

Related U.S. Application Data

(60) Provisional application No. 61/030,649, filed on Feb. 22, 2008.

(51) Int. Cl.
*H04N 5/93* (2006.01)
(52) U.S. Cl. ...................................................... 386/282
(58) Field of Classification Search ........................ None
See application file for complete search history.

(56) References Cited

U.S. PATENT DOCUMENTS 5,715,461 A 2/1998 Yoshitomi
7,944,953 B2 * 5/2011 Bulkowski et al. ........... 370/543

FOREIGN PATENT DOCUMENTS

JP 7-306778 A 11/1995

OTHER PUBLICATIONS

English language Abstract of JP 7-306778 A (Nov. 21, 1995).

* cited by examiner

*Primary Examiner* — Brandon Hoffman
(74) *Attorney, Agent, or Firm* — Greenblum & Bernstein, P.L.C.

(57) ABSTRACT

A video creating system includes: a plurality of individual editing tools for creating and/or editing the plurality of video constituent data; a server that acquires the plurality of video constituent data thus created and/or edited and creates one piece of video data by integrating the acquired video constituent data; and a target display section for displaying the video data acquired from the server on a predetermined machine platform. Each of the plurality of individual editing tools includes a data transmitting section that continuously operates on the individual editing tool. Whenever the video constituent data are created and/or edited, the data transmitting section transmits new video constituent data thus created and/or edited to the server. Whenever the new video constituent data are acquired, the server continuously creates the latest video data by integrating the plurality of video constituent data including the new video constituent data.

13 Claims, 2 Drawing Sheets

VIDEO CREATING SYSTEM AND PROGRAM PRODUCT FOR CREATING VIDEO

CROSS-REFERENCE TO RELATED APPLICATION

The present application claims the benefit of U.S. Provisional Application No. 61/030,649, filed on Feb. 22, 2008, the disclosure of which is expressly incorporated herein by reference in its entirety.

BACKGROUND OF THE INVENTION

1. Field of the Invention

The present invention relates to a video creating system and a program product for creating a video which completes one video work by integrating a plurality of video constituent data.

2. Description of the Related Art

A large number of designers cooperatively work in processes such as character design, motion design, effect creation, layout design, sound design and scene editing, by which video games or animations by three-dimensional CG (Computer Graphics) or the like are created. In creation of such a video game or animation, it is difficult to grasp the overall work because a scale of work is very large. As a result, problems such as inefficiency of work and difficulty in balance adjustment between tasks of development work occur readily. In particular, the creation of video work has a peculiar problem that individual work is to be advanced while confirming visibility as a final result. Therefore, a new system capable of solving these problems has been required.

In this regard, as a conventional managing system that can be used during large-scale software development, a development managing system disclosed in Japanese Patent Application Publication No. 7-306778 (hereinafter, referred to as "Patent Document 1") and the like have been known.

However, in the conventional managing system as represented by the above Patent Document 1, there is no system that can solve the problems described above peculiar to creation of video work, and it became a factor to prevent efficiency of development work on a site of large-scale software development.

SUMMARY OF THE INVENTION

The present invention has been made in view of existence of the problems described above, and it is an object of the present invention to provide a new system capable of carrying out development work effectively in the case of carrying out large-scale development of video work, and further of carrying out balance adjustment between tasks of development work easily.

In order to achieve the above object, one aspect of the present invention is directed to a video creating system. The video creating system according to the present invention is a video creating system for completing one video work by integrating a plurality of video constituent data. The video creating system includes a plurality of individual editing tools for creating and/or editing the plurality of video constituent data.

The video creating system also includes a server that acquires the plurality of video constituent data thus created and/or edited and creates one piece of video data by integrating the acquired video constituent data.

The video creating system also includes a target display section for displaying the video data acquired from the server on a predetermined machine platform.

In this case, each of the plurality of individual editing tools includes a data transmitting section that continuously operates on the individual editing tool. Whenever the video constituent data are created and/or edited, the data a transmitting section transmits new video constituent data thus created and/or edited to the server. Whenever the new video constituent data are acquired, the server continuously creates the latest video data by integrating the plurality of video constituent data including the new video constituent data.

In the video creating system according to the present invention, it is preferable that in the plurality of individual editing tools, an objection creating section for carrying out creation and/or editing of an object; a motion creating section for creating and/or editing motion of the object; an image editing section for editing an image of the object and the motion thus created; a display outputting section for displaying and outputting the object and the motion thus created; a position editing section for defining and editing a coordinate position of the created object; an effect editing section for creating an movie effect image; a sound editing section for creating a sound effect; and a scene editing section for integrating the object, the motion, the edited image, the coordinate position, the movie effect image and the sound effect to display and output a video scene are included.

Further, in the video creating system according to the present invention, it is preferable that the server includes a connecting section for network connection between the plurality of individual editing tools and the target display section and the server.

Moreover, in the video creating system according to the present invention, it is preferable that the server includes a video constituent data managing section for managing the video constituent data to be transmitted from the plurality of individual editing tools, and that the video constituent data managing section includes: a video constituent data storing section for causing a storage device to temporarily store the video constituent data to be transmitted from the plurality of individual editing tools, the server including the storage device; a data integrating section for carrying out a process to read out the plurality of video constituent data stored by the video constituent data storing section and to integrate the plurality of video constituent data; and an integrated data storing section for temporarily storing the integrated video data in the storage device of the server.

Furthermore, in the video creating system according to the present invention, it is preferable that the target display section has a plurality of target display sections, and platforms of the target display sections are ones of different kinds from each other.

Further, in the video creating system according to the present invention, it is preferable that each of the sections included in the plurality of individual editing tools is configured by a separate computer and the computers are connected to each other by a network.

In order to achieve the above object, another aspect of the present invention is directed to a program product for creating a video. The program product for creating a video according to the present invention causes a video creating system to integrate a plurality of video constituent data to complete one video work, the video creating system being constructed by combining a plurality of computers. In this case, the video creating system includes a plurality of individual editing tools for creating and/or editing the plurality of video constituent data; a server that acquires the plurality of video constituent data thus created and/or edited and creates one piece of video data by integrating the acquired video constituent data; and a target display section for displaying the video data acquired from the server on a predetermined machine platform. Each of the plurality of individual editing tools includes a data transmitting section that continuously operates on the individual editing tool.

The program product causes the data transmitting section to transmit, whenever the video constituent data are created and/or edited, new video constituent data thus created and/or edited to the server.

The program product also causes the server to continuously create, whenever the new video constituent data are acquired, the latest video data by integrating the plurality of video constituent data including the new video constituent data.

Since the video creating system according to the present invention has the above configuration, in development of the video work, each developer can advance individual work in the individual editing tools while confirming visibility of the video as a final result via the target display section. This makes it possible to carry out development work efficiently even in large-scale development of video work, and in addition, it is possible to carry out balance adjustment between tasks of development work easily.

Further, the video constituent data managing section according to the present invention allows integrated data in development work advanced by a large number of people to be updated substantially in real time. Thus, it is possible to confirm workmanship of a video without time lag. Therefore, mismatch between development lines occurs hardly.

Furthermore, in the present invention, since plural types of reproduction devices are provided as the target display section, adjustment for a plurality of platforms can proceed in one development schedule in parallel, and video development for multi-platform can be carried out with the one development schedule.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings.

DETAILED DESCRIPTION OF THE INVENTION

Hereinafter, preferred embodiment for implementing the present invention will be described with reference to the accompanying drawings. In this regard, the present invention claimed in each claim is not limited to the following embodiment. Further, all combinations of features to be explained in the embodiment are not always essential to elements of the present invention.

Figure 1:
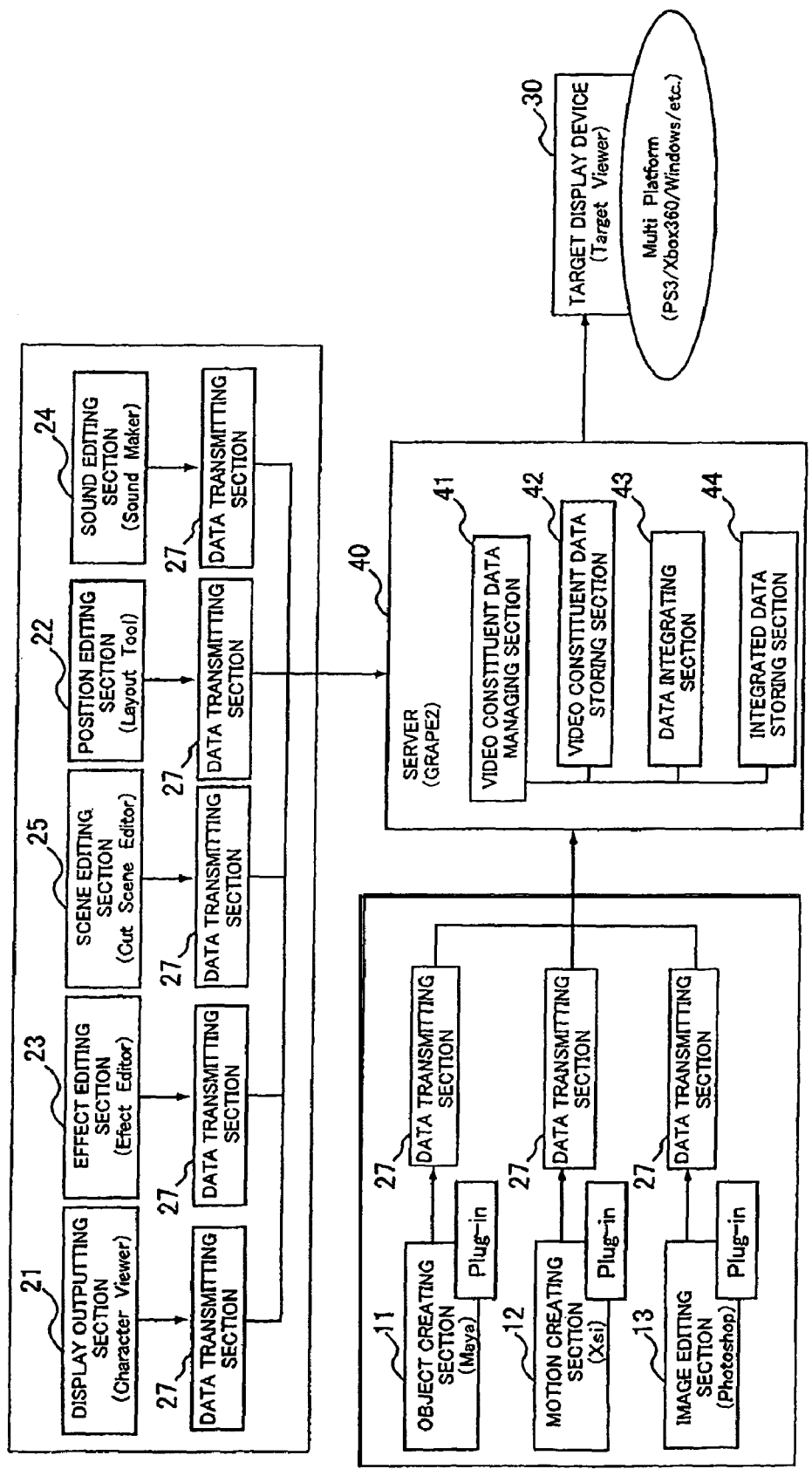
FIG. 1 is a block diagram illustrating an overall configuration of a video creating system according to the present embodiment.

FIG. 1 is a block diagram illustrating an overall configuration of a video creating system according to the present embodiment. A video creating system according to the present embodiment includes a plurality of individual editing tools 22, 23, 24, 25 for editing a plurality of video constituent data (for example, model data, effect data, scene editing information, position editing information, sound data and the like), respectively. The plurality of video constituent data are to be components of one piece of video data (animation or the like). As concrete examples of the individual editing tools, a position editing section 22 for defining and editing a coordinate position of a created object (item and the like that appear in a video); an effect editing section 23 for creating a movie effect image; a sound editing section 24 for creating a sound effect; and a scene editing section 25 for integrating the object, motion, the edited image, the coordinate position, the movie effect image and the sound effect into a video scene to display and output it are shown in the present embodiment.

Further, in the present embodiment, as the individual editing tools for editing model data, an object creating section 11 for carrying out creation and/or editing of an object; a motion creating section 12 for creating and/or editing motion of the object; an image editing section 13 for editing an image of the created object and motion; and a display outputting section 21 for displaying and outputting the created object and motion are illustrated. Video constituent data edited by these individual editing tools 11, 12, 13, 21, 22, 23, 24, 25 are subjected to a process of integration of data implemented by a server 40 (will be described later) to be created as video data. In this regard, the integration of data means a process to cause different kinds of video constituent data to be incorporated organically with each other.

A concrete configuration of each of the individual editing tools 11 to 25 includes a computer, applications running on the computer and the like. The number of computers may be one. Alternatively, the computer may be constructed so that a plurality of computers are arranged in the respective sections shown in the block diagram of FIG. 1 and combined with each other.

Further, when video constituent data are created or edited in each of the individual editing tools 11 to 25, the video constituent data during editing are always temporarily stored (or overwrite saved) in a storage device such as a hard disk. In other words, editing of video constituent data in each of the individual editing tools 11 to 25 is executed while the video constituent data during editing are always temporarily stored (or overwrite saved) in a hard disk or the like. Thus, the latest video constituent data always exist in the storage device such as a hard disk that each of the individual editing tools 11 to 25 has.

Moreover, as a characteristic of the video creating system according to the present embodiment, a data transmitting section 27 that always operates is provided in each of the editing tools 11 to 25. This data transmitting section 27 is a section composed of a program for monitoring and data transmission. The data transmitting section 27 always monitors a temporarily storing operation of video constituent data into the storage device such as a hard disk that each of the individual editing tools 11 to 25 has. The data transmitting section 27 is adapted to transmit temporarily stored video constituent data to the server 40 (will be described later) when temporary storage is executed.

The video creating system according to the present embodiment includes the server 40. The server 40 is composed of a computer as a concrete configuration. The server 40 is provided with facilities for network connection between the server 40 and the plurality of individual editing tools 11 to 25 described above and a target display device 30 as a reproduction device (will be described later) (for example, LAN connection equipment and the like).

Further, as characteristics of the present embodiment, the server 40 includes a video constituent data managing section 41. To specifically explain this video constituent data managing section 41, the video constituent data managing section 41 includes: a video constituent data storing section 42 for temporarily storing (or overwrite saving) video constituent data transmitted from each of the individual editing tools 11 to 25 in a storage device such as a hard disk; a data integrating section 43 (composed of an integration process application and the like) for executing a process to read out the video constituent data stored in the video constituent data storing section 42 to integrate them; and an integrated data storing section 44, for temporarily storing (or overwrite saving) the integrated data in the hard disk or the like.

In the video constituent data managing section 41 having such a configuration, when video constituent data are transmitted from each of the individual editing tools 11 to 25, the video constituent data storing section 42 temporarily stores them. Here, in the video constituent data, plural kinds of data including model data, effect data, scene editing information, position editing information, sound data and the like exist, and the data temporarily stored by the video constituent data storing section 42 are distinguished into the plural kinds of data and stored. Further, such plural kinds of video constituent data are not transmitted at the same time for all kinds, but normally transmitted separately one kind by one kind. Thus, temporary storage is also executed each time one kind by one kind. However, there may be the case where some kinds of video constituent data are transmitted exactly at the same time as rare phenomenon. Even in such a case, the video constituent data storing section 42 is configured so as to be capable of temporarily storing a plurality of video constituent data transmitted at the same time.

On the other hand, the data integrating section 43 monitors presence or absence of temporary storage of video constituent data as a resident program. When there is temporary storage of video constituent data even for one kind, the data integrating section 43 executes data integration of these video constituent data. Namely, the data integrating section 43 reads out all of the video constituent data stored in the video constituent data storing section 42 to execute an integration process, and then temporarily stores the integrated data in the integrated data storing section 44.

The video data are completed in the server 40 as described above. However, the video creating system according to the present embodiment further includes a target display device 30, and the target display device 30 is adapted to be capable of reproducing the completed video data.

The target display device 30 includes plural types of reproduction devices and a display device as a concrete configuration. A concrete example of each reproduction device is a computer as a game machine. The type of reproduction device means a type of game machine, and the type of game machine (Playstation3, XBOX360, Wii and the like) means a kind of platform provided to execute application programs that can be implemented by machine architecture, an operating system or the like.

In this regard, in the target display device 30 according to the present embodiment, run-time or the like is provided for each of the reproduction devices appropriately. Thus, integrated data that are data integrated with a predetermined single format (that is, video data) can be reproduced in any of different types of reproduction devices.

Each of the reproduction devices as the target display device 30 executes a reproducing process when a reproducing instruction is received. The reproducing instruction here may be a command inputted via a controller or the like of a game machine, or may be a command transmitted from each of the individual editing tools to the reproduction device via a network (the server 40). When the reproduction device receives this reproducing instruction, the reproduction device reads out video data temporarily stored in the integrated data storing section 44 via the server 40, and reproduces the video data thus read out. The reproduced video data can be displayed on the display device described above. For example, in the case where the display device is a monitor or the like connected to the game machine, the video data are displayed on this monitor.

In this regard, as another configuration that the target display device 30 can adopt, a display device can also be configured as a computer different from the reproduction device. For example, the display device in this case can be configured as a personal computer placed at a desk of each developer who carries out video editing and the like. This personal computer is connected to the reproduction device via the network (server 40), and it is preferable that a viewer section (for example, client application of a remote control and the like) is provided in the personal computer. When each developer inputs a command of a reproducing instruction by means of a keyboard or the like of the personal computer, the viewer section receives this and the command of the reproducing instruction is transmitted. Each reproduction device that receives the transmitted command executes the reproduction described above.

On the other hand, an image service section for providing the viewer section with display information (for example, server application of a remote control and the like) can be provided in the reproduction device. The image service section transmits display information in the reproduction device (specifically, image data subjected to rendering in a video buffer memory every unit time) to the personal computer that is a source of the command. In the personal computer, the viewer section displays the transmitted display information on a screen. In the personal computer, this makes it possible to confirm the display video reproduced by the reproduction device with a display of the personal computer.

In this regard, since there are plural types of reproduction devices, a configuration of individual window display for each reproduction device may be adopted for display of a video on the display of the personal computer. Alternatively, a video may be displayed on a single window by switching the types of reproduction devices by means of a tab key or the like. Further, as another method, the command of the reproducing instruction may be inputted by specifying a type of reproduction device. In the case where the type of reproduction device is specified, reproduction can be executed only in the specified type of reproduction device.

Further, as still another configuration of the display device that is the personal computer described above, the computer of any of the individual editing tools may be configured so as to be used as the personal computer. In this case, it is advantageous because a reproduction result can be confirmed in a screen of the same display while editing an image or the like.

Figure 2:
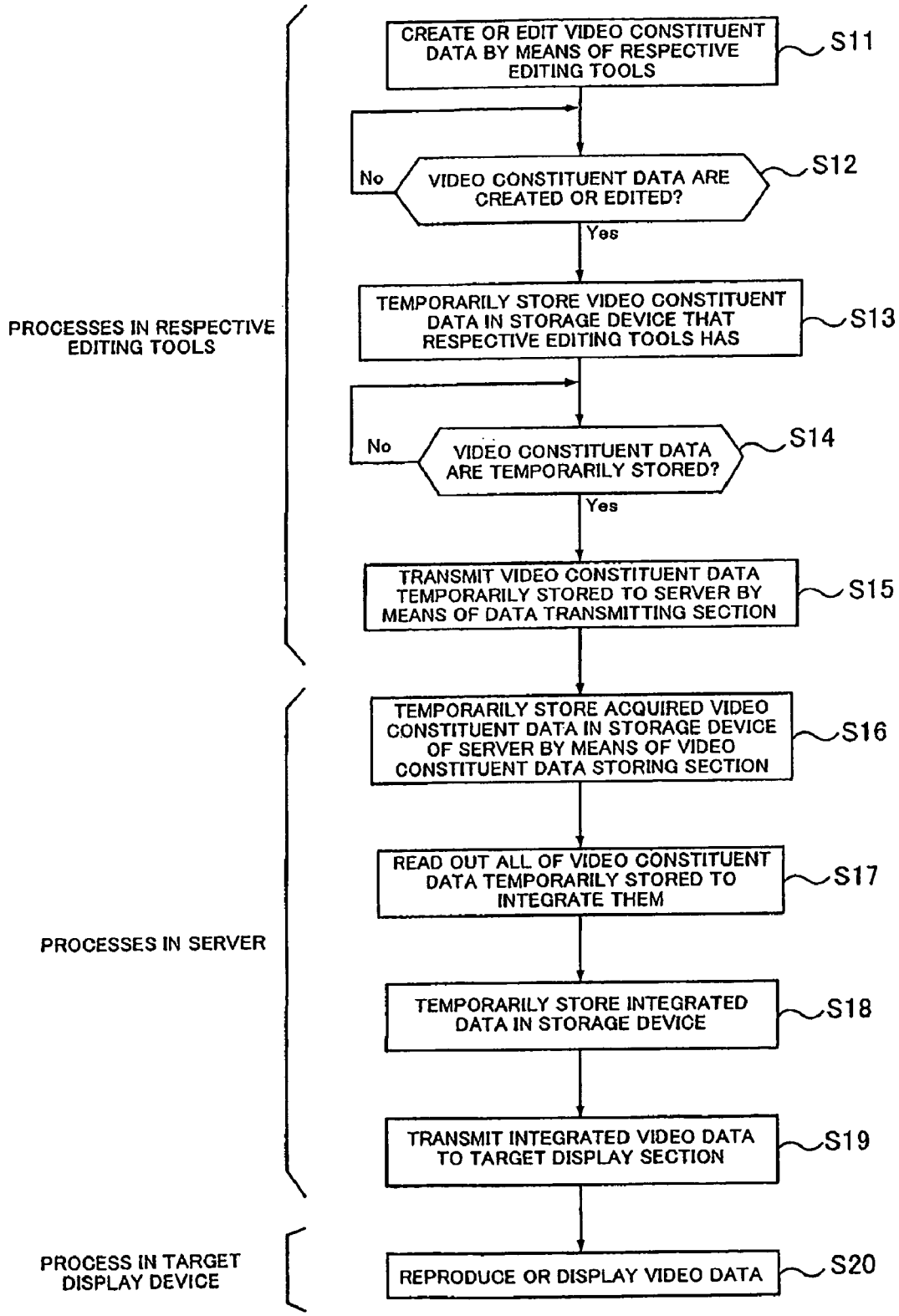
FIG. 2 is a flowchart illustrating operational procedures of the video creating system according to the present embodiment.

Next, operational procedures of the video creating system according to the present embodiment will be described with reference to FIG. 2. Here, FIG. 2 is a flowchart illustrating operational procedures of the video creating system according to the present embodiment.

When video constituent data are created or edited in each of the individual editing tools 11 to 25 (Step S11), presence or absence of editing work is confirmed by monitoring software installed in the computer that constitutes each of the individual editing tools 11 to 25 (Step S12). In the case where it is determined that editing work is executed, video constituent data thus created or edited are temporarily stored (or overwrite saved) in a storage device such as a hard disk provided in each of the individual editing tools 11 to 25 (Step S13).

This temporary storage (or overwrite saving) is executed in the middle of editing of the video constituent data, whereby the latest video constituent data always exist in the storage device such as a hard disk that each of the individual editing tools 11 to 25 has.

Further, the computer that constitutes each of the individual editing tools 11 to 25 always monitors a state where the video constituent data are temporarily stored (or overwrite saved) in its own storage device by means of the installed monitoring software. When it is confirmed that the video constituent data have been temporarily stored (or overwrite saved) (Step S14), by causing the data transmitting section 27 that the computer constituting each of the individual editing tools 11 to 25 has to operate, these temporarily stored video constituent data are transmitted to the server 40 (Step S15).

The server 40 that is a computer acquiring the video constituent data transmitted from each of the individual editing tools 11 to 25 causes the video constituent data storing section 42 to operate by means of the installed software, and to temporarily store (or overwrite save) the video constituent data transmitted from each of the individual editing tools 11 to 25 in the storage device of the server 40 side (Step S16).

Moreover, the server 40 reads out the video constituent data stored in the video constituent data storing section 42 using the data integrating section 43 composed of an integration process application and the like, and subjects them to an integration process (Step S17). Then, by causing the integrated data storing section 44 to operate by means of further installed software, a process to temporarily store (or overwrite save) the integrated video data in the storage device is executed (Step S18).

As described above, video data are completed in the server 40, and the integrated video data are transmitted to the target display device 30 using network connection equipment such as LAN connection equipment that the server 40 has (Step S19). In the target display device 30 that receives them, the latest video data can always be reproduced (Step S20).

In this regard, the processes at Steps S11 to S15, which are the processes in each of the individual editing tools 11 to 25, can proceed temporarily in parallel. Thus, the video creating system according to the present embodiment is constructed so that it can be used on a site of large-scale software development appropriately.

As explained above, the overall configuration and the operational procedures of the video creating system according to the present embodiment have been described. In particular, in the video creating system according to the present embodiment, integrated data (video data) in the development work advanced by a large number of people are updated substantially in real time in accordance with individual progress in each of the individual editing tools 11 to 25 by means of the video constituent data managing section 41. In a normal environment under which distributed development has been carried out conventionally, it was impossible to integrate module creation work in individual PCs in real time in accordance with progress. However, the video constituent data managing section 41 described above that the video creating system has allows balance adjustment between tasks of development work to be carried out easily.

Further, the video creating system according to the present embodiment adopts a configuration in which integrated data (video data) are stored in a predetermined format and various reproduction devices use the data of the predetermined format together using run-time. Normally, development of software adapted to one platform is first carried out, and after it is completed, conversion and porting to other platforms are carried out. However, in this porting work, whether program operation is appropriate or not became a problem, and it was impossible to adjust fine material (design and the like). In particular, in the case of the video work, if a platform is different, color, an angle of camera, resolution and the like are different. Thus, the necessity to deal with the problem regarding fine material arises, whereby back track of a development process becomes large. However, in the video creating system according to the present embodiment, one common to all platforms is advanced from the beginning of the development process. Therefore, it is possible to develop the video work without back track of the development process.

Moreover, in the video creating system according to the present embodiment, it becomes easy to provide plural types of reproduction devices at the same time. This is because it has a configuration in which integrated data (video data) are stored in a predetermined format and various reproduction devices use the data of the predetermined format together using run-time. According to such a configuration, since there is no need to create a plurality of formats for integrated data for every platform, there is an advantage that it has a simple configuration compared with the prior art.

As described above, although the preferred embodiment of the present invention has been described, the technical scope of the present invention is not limited to the scope described in the above embodiment. Various changes or modifications can be applied to the embodiment described above.

For example, the target display device 30 according to the present embodiment described above may be configured so as to have a data delivering server connected to each reproduction device via the network (server 40). In the case of this configuration, when the integrated data storing section 44 temporarily stores integrated data (video data), the integrated data storing section 44 may transmit an reproducing instruction to each reproduction device. In other words, whenever the integrated data (video data) are updated, each reproduction device starts to reproduce these data immediately. With the reproduction, the image service section (for example, server application of a remote control and the like) transmits this reproduced image to the data delivering server. In the data delivering server that acquires the reproduced image, display information (animation data) transmitted from these reproduction devices are to be stored with respect to the types of reproduction devices. Further, a providing section (by a delivering control program) for streaming delivery of animation can be provided in the data delivering server. The display information is delivered on the basis of an instruction from each personal computer. According to the above configuration, since only one reproducing process at the reproduction device is required every update of the integrated data, it is possible to reduce a machine load. Further, it is convenient because display information can be delivered without trouble by streaming delivery by means of the data delivering server even when there are instructions from a large number of personal computers with time lag.

Further, the video creating system according to the present embodiment adopts the configuration in which video data are integrated and updated substantially in real time in accordance with individual progress at each of the individual editing tools 11 to 25. However, it may be configured so that video data stored just before update are held (or stored) and the video data can be restored and used at the desired time. Alternatively, it may be configured so that previous video data are always discarded and only the latest video data are always held (or stored).

It is apparent from the description of the claims that embodiments to which such changes or modifications are applied can also be included in the technical scope of the present invention.

What is claimed is:

1. A video creating system for completing a video work by integrating a plurality of video constituent data, the video creating system comprising:
   a plurality of individual editing tools for at least one of creating and editing the plurality of video constituent data;
   a server that acquires one of the plurality of video constituent data that is at least one of created and edited and creates one piece of video data by integrating the one of the plurality of video constituent data that is acquired; and
   a target display for displaying the one piece of video data acquired from the server on a predetermined machine platform,
   wherein each individual editing tool of the plurality of individual editing tools comprises a data transmitter that continuously operates on the individual editing tool, and whenever a corresponding video constituent data of the plurality of video constituent data is at least one of created and edited by the individual editing tool, the data transmitter transmits new video constituent data thus at least one of created and edited to the server, and
   wherein, whenever the new video constituent data is acquired, the server continuously creates the one piece of video data by integrating the plurality of video constituent data including the new video constituent data.

2. The video creating system according to claim 1, wherein the plurality of individual editing tools comprise:
   an object creator for carrying out at least one of creation and editing of an object;
   a motion creator for at least one of creating and editing motion of the object;
   an image editor for editing an image of the object and the motion of the object;
   a display output for outputting the object and the motion of the object;
   a position editor for defining and editing a coordinate position of the object;
   an effect editor for creating a movie effect image;
   a sound editor for creating a sound effect; and
   a scene editor for integrating the object, the motion, the image, the coordinate position, the movie effect image, and the sound effect to output a video scene.

3. The video creating system according to claim 2, wherein each of the object creator, the motion creator, the image editor, the display output, the position editor, the effect editor, the sound editor, and the scene editor included in the plurality of individual editing tools is configured as a separate computer and connected to a network.

4. The video creating system according to claim 1, wherein the server comprises a connector for network connection between the plurality of individual editing tools and the target display and the server.

5. The video creating system according to claim 1, wherein the server comprises a video constituent data manager for managing the plurality of video constituent data to be transmitted from the plurality of individual editing tools, and wherein the video constituent data manager includes:
   a video constituent data storage for causing a storage device to temporarily store the video constituent data to be transmitted from the plurality of individual editing tools, the server comprising the storage device;
   a data integrator for carrying out a process to read out the plurality of video constituent data stored by the video constituent data storage and to integrate the plurality of video constituent data; and
   an integrated data storage for temporarily storing the plurality of video constituent data integrated by the data integrator in the storage device of the server.

6. The video creating system according to claim 1, wherein the target display has a plurality of target displays, and platforms of the target displays are ones of different kinds from each other.

7. The video creating system according to claim 1, wherein the one piece of video data comprises an application that is executable by a game platform.

8. The video creating system according to claim 1, wherein the server stores the corresponding video constituent data that is at least one of created and edited for restoring the one piece of video data.

9. The video creating system according to claim 1, wherein the data transmitter monitors a temporary storing operation of the individual editing tool to determine when the corresponding video constituent data is at least one of created and edited.

10. A non-transitory computer-readable medium including a program product for creating a video, the program product causing a video creating system to integrate a plurality of video constituent data to complete a video work, the video creating system being constructed by combining a plurality of computers, wherein the video creating system comprises:
    a plurality of individual editing tools for at least one of creating and editing the plurality of video constituent data;
    a server that acquires one of the plurality of video constituent data that is at least one of created and edited and creates one piece of video data by integrating the one of the plurality of video constituent data that is acquired; and
    a target display for displaying the one piece of video data acquired from the server on a predetermined machine platform,
    wherein each individual editing tool of the plurality of individual editing tools comprises a data transmitter that continuously operates on the individual editing tool, wherein the program product causes the data transmitter to transmit, whenever a corresponding video constituent data of the plurality of video constituent data is at least one of created and edited by the individual editing tool, new video constituent data thus at least one of created and edited to the server, and
    wherein the program product causes the server to continuously create, whenever the new video constituent data is acquired, the one piece of video data by integrating the plurality of video constituent data including the new video constituent data.

11. The non-transitory computer-readable medium according to claim 10, wherein the one piece of video data comprises an application that is executable by a game platform.

12. The non-transitory computer-readable medium according to claim 10, wherein the server stores the corresponding video constituent data that is at least one of created and edited for restoring the one piece of video data.

13. The non-transitory computer-readable medium according to claim 10, wherein the program product causes the data transmitter to monitor a temporary storing operation of the individual editing tool to determine when the corresponding video constituent data is at least one of created and edited.

* * * * *